Dec. 1, 1959 S. I. RICHARDS 2,915,358

RECORDING MEMBER ASSEMBLY FOR COMPUTER OR THE LIKE

Filed Feb. 24, 1958 2 Sheets-Sheet 1

Inventor

STANLEY RICHARDS

By Fetherstonhaugh & Co.

Att'ys

Dec. 1, 1959 S. I. RICHARDS 2,915,358

RECORDING MEMBER ASSEMBLY FOR COMPUTER OR THE LIKE

Filed Feb. 24, 1958 2 Sheets-Sheet 2

Inventor
STANLEY RICHARDS
By Fetherstonhaugh & Co.
Att'ys

United States Patent Office 2,915,358

Patented Dec. 1, 1959

2,915,358

RECORDING MEMBER ASSEMBLY FOR COMPUTER OR THE LIKE

Stanley I. Richards, Weston, Ontario, Canada, assignor to Ferranti Limited, Hollinwood, Lancashire, England Application February 24, 1958, Serial No. 717,049

2 Claims. (Cl. 346—74)

This invention relates to a magnetic storage member assembly as applied to a computer machine or the like such as, for example, the type described in co-pending application Serial No. 672,222 filed on 1st of September, 1954.

In computer and like machines, according to the invention, information is transferred to, and taken from sensitized storage members by means of magnetically operated writing or reading heads. The storage members commonly, though not necessarily, are in the form of a drum having a bore extending therethrough that slips over a cylinder whereby to define a space that functions as a fluid bearing as the storage member is rotated about the body or cylinder. The outer surface of the drum is sensitive to magnetic force and, in use, is caused to co-operate with a head which may, according to design, be adapted to transfer information to the drum or take stored information from the drum. In the former case the head is called a writing head and in the latter it is commonly called a reading head.

The space, between the storage member and the body member about which it rotates, is commonly filled with air whereby to form an air bearing during use. By design, the storage member locates itself at a fixed distance from the body during operation and, as it rotates, the space between the storage member and the reading and/or writing heads is maintained constant. However, in the event that the air supply to the air bearing fails, there is the danger that the storage member will foul or come into physical contact with the reading and/or writing heads. This is especially likely where the distance between the heads and the sensitized surface of the storage member is small, as it customarily is.

As the reading and/or writing heads are delicate pieces of apparatus, there is a serious danger of damaging them due to contact with the storage member or drum.

I overcome the possibility of damage to the reading and/or writing heads by providing a means for making the distance between the heads and the recording member greater than the distance in the air bearing between the body member and the storage member when the fluid pressure in the space that forms the fluid bearing between the two members is reduced below an operative pressure.

My invention will be clearly understood after reference to the following detailed specification read in conjunction with the drawings, wherein.

In the drawings.

Figure 1:
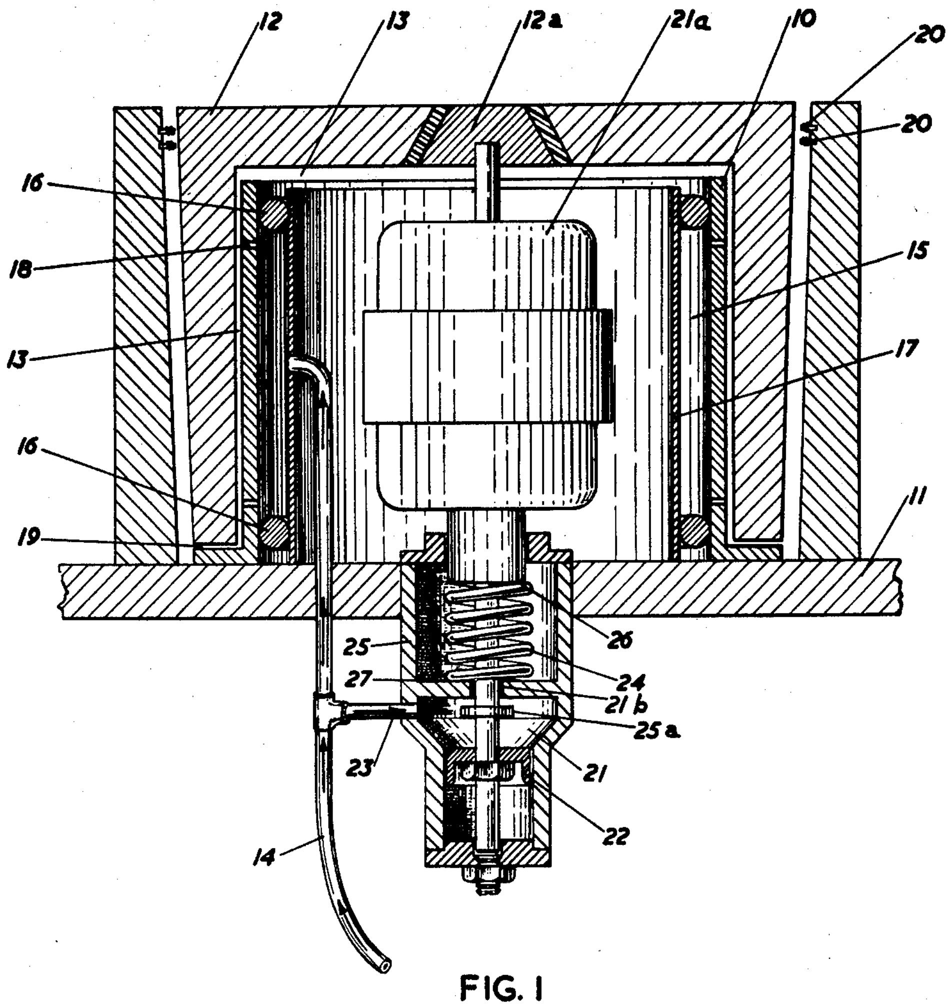
Figure 1 is a sectional view of an information storage member assembly according to the present invention.

The numeral 10 refers to a cylindrical portion of a body 11 of the recording member assembly of a computing or like machine. The numeral 12 refers to a storage member of the drum type having a bore whereby it can be slipped over the cylinder 10 to overlie the latter and define a space 13 between it and the cylinder which in use functions as a fluid bearing for the storage drum. Fluid, such as air, to maintain the fluid bearing in the space 13, is supplied through the conduit 14 into the annular space 15 that is sealed off by means of the O rings 16 between the outer cylinder 10 and the inner cylinder 17. From the annular space 15 the air passes through the outlets 18 and into the space 13 whereby to form the air bearing as aforesaid. Air escapes around the bottom of the drum 12 as at 19, in use, but the pressure of the supply 14 is sufficiently great to maintain a build up of pressure in the space 13 so that the drum 12 is symmetrically disposed with respect to the cylinder 10 at all places along its bore and the distance between the magnetically operated reading and/or writing heads 20 and the outer sensitized drum surface is maintained constant.

The numeral **21*a* refers to a motor, the rotatable shaft of which in use connects with the drum 12 through the friction clutch 12*a*** whereby to rotate the drum at a relatively fast rate of speed, as is well known in the art.

The spacing between recording heads 20 and the sensitized surface of the drum 12 is, in many cases, quite small and it will be apparent that when the fluid pressure in the space 13 is permitted to fall, when the device is not being used or due to failure of the air supply, there is a danger that the drum 12 may foul with the reading and/or writing heads 20. This is because there is no longer a build up of pressure in the space 13 to maintain the drum 12 symmetrically disposed with respect to the cylinder 10.

To avoid this latter possibility I provide for a means for separating the recording drum 12 from the body member 10 when the pressure in the space 13 of the fluid bearing is reduced below operating pressure, in such a way that the space between the bore of the storage member 12 and the cylinder of the body member 10 is greater than the space between the sensitized surface of the drum 12 and the heads 20 for all positions of the drum with respect to the cylinder. In this way, there is no possibility of the drum fouling the reading and/or writing heads 20 when the unit is inoperative.

In the embodiment of the invention shown, the motor assembly, that drives the recording drum 12, is adapted to raise the drum with respect to the body member in response to a failure of pressure in the space 13 of the fluid bearing. As shown, the drum 12 is tapered towards the bottom end thereof so that as the drum is raised the distance between the heads 20 and the sensitized side of the drum increases. This is apparent from Figure 2.

The means for effecting the operation of raising the drum includes the cylinder 21 with the piston 22 therein that is carried by the free end of the shaft of the motor **21*a*. Cylinder 21 communicates through the conduit 23 with the supply conduit 14 that carries air to the air bearing, whereby the piston 22 is subject to the air pressure for the air bearing. A spring 24 is compressed between a shoulder on the motor shaft as at 26 and a shoulder in the housing 25 as at 27 to normally urge the motor 21*a* upwardly of the position illustrated in Figure 1 to a position illustrated in Figure 2 and limited by the stop 25*a*. The air pressure from the line 23 acting on the piston 22 tends to force the motor in a downward direction against the pressure of spring 24. The spring 24 is designed such that when the pressure in line 23 is operative to maintain the required designed pressure in the air bearing 13, there is sufficient force on the piston 22 due to the air pressure to hold the motor assembly in the position illustrated in Figure 1 against spring 24**.

Figure 2:
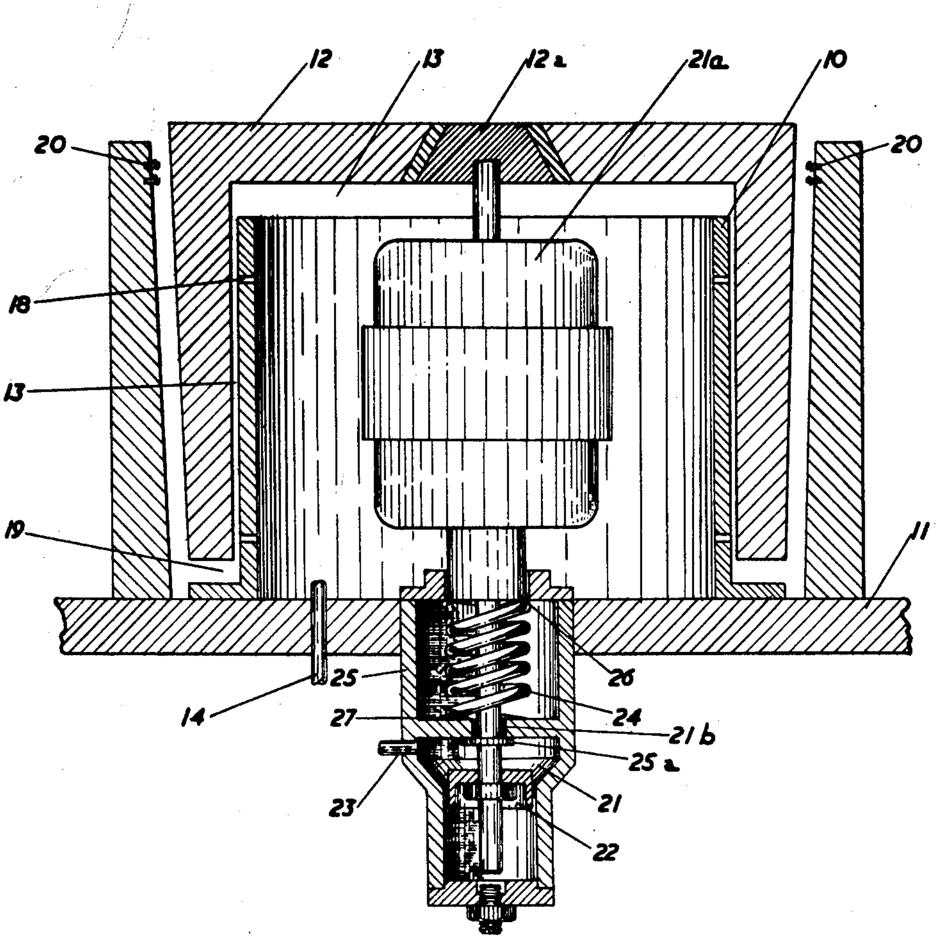
Figure 2 is a view similar to Figure 1 but omitting certain detail and illustrating the drum in an upward position.

When, however, the pressure fails in line 14 and hence in the line 23 and cylinder 21, the force on the upper surface of piston 22 is reduced and the spring 24 expands to carry the motor 21*a* in an upward direction that is limited by engagement of the shoulder 25*a* on the motor shaft with the top surface of the cylinder 21. (The upward position is illustrated in Figure 2. In Figure 2 the inner cylinder 17 and the rings 16 have been omitted.) This, of course, carries the drum, which is resting on the motor assembly, in an upward direction whereby to increase the distance between the drum and the heads 20. The increase is designed such that distance between the heads and the sensitized surface of the drum is always enough such that the drum can not foul with the heads due to any unsymmetrical distribution of the space as at 13 between the drum and the cylinder. A suitable packing 21*b* is provided around the shaft between the cylinder 21 and chamber 25.

Embodiments of the invention other than the one illustrated will, of course, be apparent to those skilled in the art. My invention is the automatic movement of the recording member whereby to increase the distance between it and the heads so that fouling can not occur when the air pressure of the air bearing fails. It is not my intention then that my invention should be limited to the foregoing description with the exception of the limitations expressed in the following claims.

I claim:

1. In an information storage assembly for a computing machine of the type having a body, a head on said body, a storage member, means for rotating said storage member with respect to said body, said storage member overlying said body and in use defining together with said body a space that functions as a fluid bearing as said storage member rotates with respect to said body, said body being formed with passage means whereby said fluid space is connectible to an operating fluid supply; the improvement of safety release means for moving said storage member with respect to said head on said body between an inoperative and an operative position, said safety release means including a pressure receiving vessel and a movable member, said pressure receiving vessel being connectible with the pressurized fluid supply for operating said fluid bearing, said movable member being responsive to the pressure in said pressure receiving vessel to move said storage member to an inoperative position with respect to said head when the pressure in said pressure receiving vessel is below operating pressure, said movable member being responsive to the pressure in said pressure receiving vessel to maintain said storage member in an operative position with respect to said head when the pressure in said pressure receiving vessel is at normal operating pressure, said storage member having a cut-away recording surface whereby the space between said surface and said head increases as said movable member moves said storage member from an operative position to an inoperative position with respect to said head as aforesaid, the space between said storage member and said head being greater than the space between said storage member and said body for all positions of rest of said storage member when said storage member is in an inoperative position with respect to said head.

2. An assembly as claimed in claim 1 in which said pressure vessel comprises a cylinder and said movable member comprises a piston for said cylinder, said safety release means further including a spring, said spring being compressed and adapted to urge said piston in opposition to the pressure of the fluid supply to said fluid bearing thereon, said piston being connected to said storage member to move it as aforesaid, said spring having a strength adapted to be overcome by the operating fluid pressure during normal operation of said assembly whereby said piston moves under the action of fluid pressure in use to move said storage member to an operative position with respect to said head, said spring further having a strength capable of overcoming said fluid pressure and actuating said piston when the fluid pressure in said fluid bearing is below operating pressure to move said storage member to an inoperative position.

No references cited.